(12) United States Patent
Nagata et al.

(10) Patent No.: US 10,871,769 B2
(45) Date of Patent: Dec. 22, 2020

(54) MANUFACTURING SYSTEM AND MANUFACTURING METHOD

(71) Applicant: HITACHI, LTD., Tokyo (JP)

(72) Inventors: Koichiro Nagata, Tokyo (JP); Akihiro Nakamura, Tokyo (JP); Shuji Soga, Tokyo (JP); Naohito Ikeda, Tokyo (JP); Gen Tsuchida, Tokyo (JP)

(73) Assignee: HITACHI, LTD., Tokyo (JP)

( * ) Notice: Subject to any disclaimer, the term of this patent is extended or adjusted under 35 U.S.C. 154(b) by 152 days.

(21) Appl. No.: 15/920,497

(22) Filed: Mar. 14, 2018

(65) Prior Publication Data

US 2018/0292813 A1    Oct. 11, 2018

(30) Foreign Application Priority Data

Apr. 10, 2017   (JP) .................. 2017-077301

(51) Int. Cl.
*G05B 19/418*   (2006.01)

(52) U.S. Cl.
CPC ............. *G05B 19/4188* (2013.01); *G05B 2219/31001* (2013.01); *G05B 2219/41326* (2013.01); *Y02P 90/02* (2015.11); *Y02P 90/30* (2015.11)

(58) Field of Classification Search
None
See application file for complete search history.

(56) References Cited

U.S. PATENT DOCUMENTS

| | | | |
|---|---|---|---|
| 2003/0158795 A1* | 8/2003 | Markham | B23Q 35/12 705/28 |
| 2014/0354198 A1 | 12/2014 | Sato et al. | |
| 2016/0096693 A1* | 4/2016 | Hanaoka | B65G 53/66 406/19 |

FOREIGN PATENT DOCUMENTS

| | | |
|---|---|---|
| CN | 101950171 A | 1/2011 |
| JP | 2002-236511 | 8/2002 |
| JP | 2003-167527 A | 6/2003 |
| JP | 5472285 B2 | 4/2014 |

OTHER PUBLICATIONS

Xenos et al., "Optimization of a network of compressors in parallel: Real Time Optimization (RTO) of compressors in chemical plants—An industrial case study", Applied Energy 144 (2015) 51-63 (Year: 2015).*
Notice of Reasons for Refusal issued in corresponding Japanese Patent Application No. 2017-077301 dated Jul. 7, 2020.
Office Action issued in corresponding Chinese Patent Application No. 201810210138.2 dated Sep. 2, 2020.

* cited by examiner

*Primary Examiner* — Carlos R Ortiz Rodriguez
(74) *Attorney, Agent, or Firm* — Mattingly & Malur, PC

(57) ABSTRACT

A manufacturing system 10 is configured to include a driving device 4 configured to drive a manufacturing machine 5 in a step pertaining to product manufacture in a predetermined production management system, the driving device 4 driving the manufacturing machine 5 in the step in response to predetermined information obtained related to a state of the step.

7 Claims, 6 Drawing Sheets

SMOOTHNESS ON XX PART SURFACE IS V — 7

FIG. 2A

SMOOTHNESS ON XX PART SURFACE IN STEP YY IS INCREASED BY Z% — 11

FIG. 2B

SMOOTHNESS ON XX PART SURFACE IN STEP YY IS INCREASED BY Z% — 21

FIG. 2C

SMOOTHNESS ON XX PART SURFACE IN STEP YY IS W — 31

FIG. 2D

SMOOTHNESS ON XX PART SURFACE IN STEP YY IS W — 32

FIG. 2E

MANUFACTURING SYSTEM AND MANUFACTURING METHOD

CROSS-REFERENCE TO RELATED APPLICATION

This application claims priority pursuant to 35 U.S.C. § 119 from Japanese Patent Application No. 2017-077301, filed on Apr. 10, 2017, of which is incorporated herein by reference.

BACKGROUND

The present invention relates to a manufacturing system and manufacturing method, and more specifically, relates to a technique including an upper system configured to manage overall manufacturing steps and a lower system configured to control each step, which technique reduces a time lag occurring to a command from the upper system to the lower system, allowing improvement in manufacturing efficiency and quality.

In a conventional common manufacturing system, the entire manufacturing line is managed and controlled by an upper system such as a manufacturing execution system (MES). Such an upper system outputs predetermined commands to an operation control system (e.g., PLC, DCS) equivalent to a lower system, and controls a multiple number of manufacturing steps. At this time, the upper system provides target values for each step to the lower system, in the light of information of step results collected from each step.

On one hand, in each step involved with the lower systems, various operations according to manufacture are carried out by driving a predetermined device such as a motor with an inverter, for example, kneading, stirring, and extrusion. In this case, the lower system provides, to the aforementioned predetermined device, not a target value of that step (e.g., a value given from the upper system, such as softness resulting from kneading), but a rotational speed, torque of the motor or the like, as the target value. On the other hand, information such as the results in each step (e.g., characteristics and precision of semifinished products produced by operations in that step) is sent from sensors or the like that obtained the information, to the upper and lower systems. Moreover, the upper system and the lower system convert the aforementioned information such as the results as appropriate, generate a target value for driving a predetermined device, such as a rotational speed or a torque, and provide the target value to the predetermined device.

As a conventional technique related to such a manufacturing system, an actuator control device (100) is proposed, for example, the actuator control device (100) including: an upper control unit (10) configured to set an upper target value (tg1) of a predetermined control factor related to driving the actuator; a lower control unit (20) having a command input element (21) configured to output a lower target value (tg2) of the predetermined control factor, the lower target value having a value different from the target value upon receiving input of the upper target value, an actuator control element (22) configured to control the actuator upon receiving an input of the lower target value, and a following element (23) that makes an actual value of the predetermined control factor in the actuator follow the lower target value; and an intermediate control unit (30) configured to make an actual value of the predetermined control factor in the actuator follow the upper target value, wherein the upper target value is inputted into the command input element of the lower control unit via the intermediate control unit, the intermediate control unit (30) increases or decreases the upper target value to be inputted into the command input element (21) so as to have the actual value of the predetermined control factor match the upper target value, a value inputted into the following element (23) and a value inputted into the intermediate control unit (30) are the same factors, the following element (23) and the intermediate control unit (30) each constitutes a closed loop that provides feedback of the actual value of the predetermined control factor, and a following speed of the actual value of the predetermined control factor by the intermediate control unit (30) to the upper target value is slower than a following speed of the actual value of the predetermined control factor by the following element (23) to the lower target value. See Japanese Patent Application Laid-open Publication No. 5472285.

However, since a series of procedures such as the collection, conversion, and providing of information as described above are performed between the upper and lower systems and the predetermined devices that perform the steps, a time difference readily generates between the operations performed in the steps and the controls with respect to those operations.

Moreover, when manufacturing products upon undergoing a plurality of steps, errors generated in upstream steps that occur away from the target values need to be compensated in downstream steps thereafter. This may cause burden on the steps thereafter. Therefore, to improve the manufacturing efficiency and quality of the product, it is necessary to quickly detect the state of the aforementioned steps and reflect them promptly on the steps. However, no technique that can deal with such issues have been proposed.

SUMMARY OF THE INVENTION

Accordingly, an object of the present invention is to provide, in a manufacturing system constituted of an upper system configured to manage overall manufacturing steps and a lower system configured to control each step, a technique to reduce a time lag occurring in relation to a command from the upper system to the lower system, and allow improvement in efficiency and quality of manufacture.

Means to Solve the Problem

A manufacturing system according to the present invention that solves the above problem is characterized in that a driving device configured to drive a manufacturing machine in a step pertaining to product manufacture in a predetermined production management system is configured to drive the manufacturing machine in the step according to predetermined information obtained related to a state of the step.

Moreover, a manufacturing method of the present invention is characterized in that, in a predetermined production management system, a driving device configured to drive a manufacturing machine in a step pertaining to product manufacture drives the manufacturing machine in the step according to predetermined information obtained related to a state of the step.

According to the present invention, in a manufacturing system including an upper system configured to manage the overall manufacturing steps and a lower system configured to control each step, a time lag occurring in relation to a command from the upper system to the lower system can be reduced, thus allowing improvement in efficiency and quality of manufacture.

BRIEF DESCRIPTION OF THE DRAWINGS

FIG. 2A is a view illustrating an example of a step target in Example 1.

FIG. 2B is a view illustrating an example of a lower target value in Example 1.

FIG. 2C is a view illustrating an example of a driving target in Example 1.

FIG. 2D is a view illustrating an example of step result information in Example 1.

FIG. 2E is a view illustrating an example of step result information for driving in Example 1.

DETAILED DESCRIPTION OF EMBODIMENTS

Example 1

Figure 1:
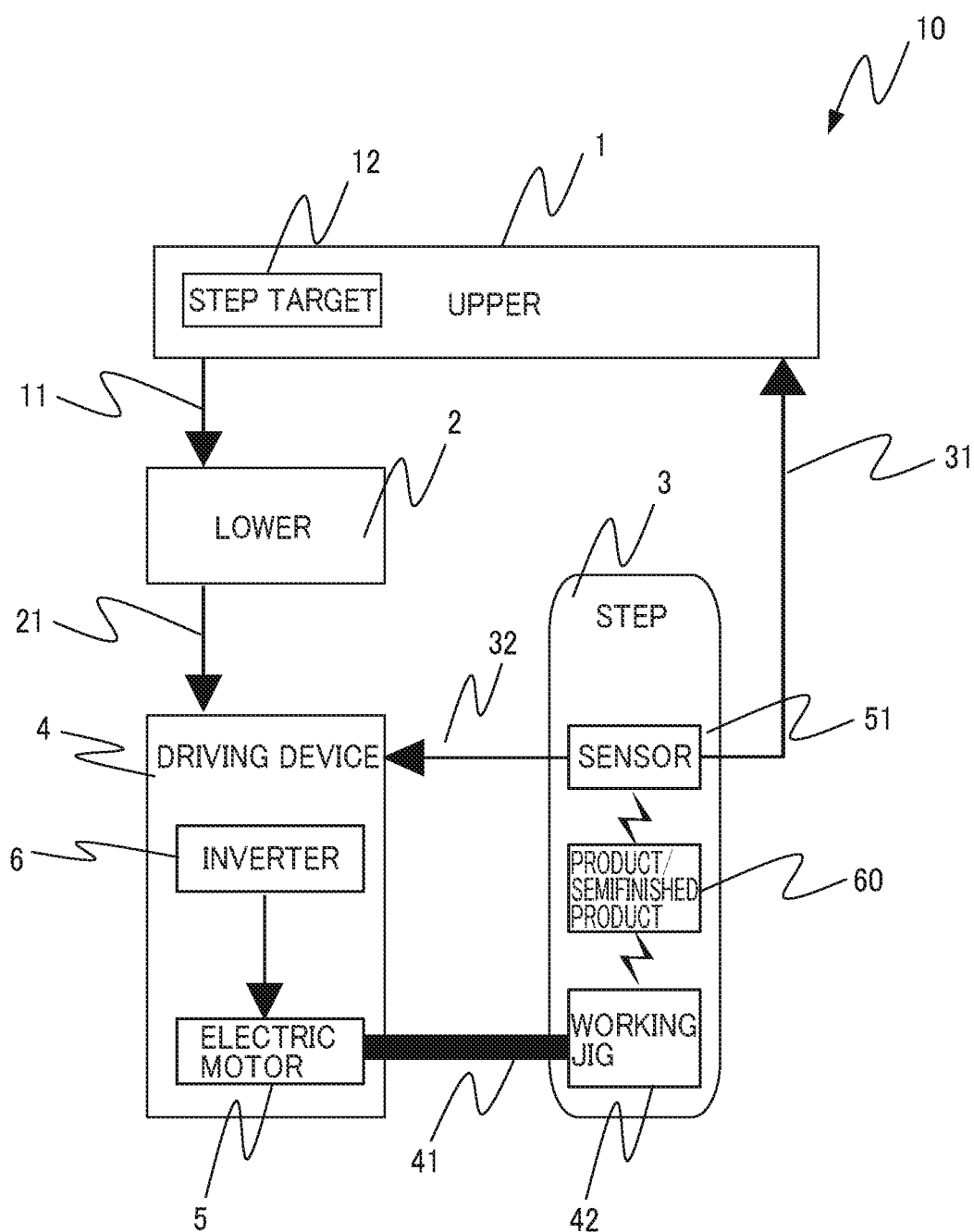
FIG. 1 is a view illustrating a configuration example of a manufacturing system in Example 1.

The following describes in detail embodiments of the present invention, with reference to the drawings. FIG. 1 is a view illustrating a configuration example of a manufacturing system 10 in Example 1. A manufacturing system 10 shown in FIG. 1 is a manufacturing system configured of an upper system 1 configured to manage the overall manufacturing steps and a lower system 2 configured to control each step, in which the system reduces a time lag occurring in relation to a command from the upper system to the lower system, and allows for improvement in efficiency and quality of manufacture.

This specification assumes, as one example of the manufacturing system 10, a system in which the upper system 1 such as a manufacturing execution system (MES) and the lower system 2 such as PLC manage and control step 3, which performs manufacturing of a predetermined product.

Moreover, the aforementioned step 3 is performed by driving a working jig 42 (e.g., cutting tool, forging tool, stirring rotor) via driving means 41 such as an axle or a shaft with an electric motor 5 (manufacturing machine) controlled by an inverter 6 of the driving device 4. The specification assumes, as one example, a configuration in which the inverter 6 in the driving device 4 controls the electric motor 5 being the manufacturing machine, however it is not limited to the above. Moreover, the driving device 4 is illustrated as a configuration including the inverter 6 and the electric motor 5, however the device 4 may be configured as just including the inverter 6.

In such manufacturing system 10, the upper system 1 takes in a target of step 3 from step 3, namely step result information 31 (see FIG. 2D) pertaining to a step target 12 (see FIG. 2A), and may provide to the lower system 2 a lower target value 11 based on this step result information 31 (see FIG. 2B). On the other hand, the lower system 2 has the lower target value 11 as a driving target 21 (see FIG. 2C), and provides the lower target value 11 to the driving device 4.

For example, a quality indicating at least any one of hardness, smoothness, shape, temperature, moisture, and agitation degree of a product or semifinished product to be obtained in the end (hereinafter, product/semifinished product 60) upon undergoing a series of steps (of course this may be a single step) that the upper system 1 is responsible for, may be assumed as the step target 12. That is to say, a state that the quality of the product/semifinished product 60 produced by the steps should be achieved as a result of performing the series of steps, serves as the step target. The driving device 4 of the present embodiment may be capable of retaining such step target information in a predetermined storage means in advance. Moreover, the upper system 1 may provide this step target to the lower system 2.

The step result information 31 is information related to quality, which serves as the aforementioned step target, including, for example, a measured value related to the surface hardness and smoothness of the product, a curvature value indicating a shape of a predetermined part, and measured values of temperature, moisture, and agitation degree of the member, by a sensor 51.

Therefore, the aforementioned lower target value 11 is one that is in response to driving details of the electric motor 5 (e.g., increase smoothness by 20% from the current value) for achieving the aforementioned step target value (e.g., target value of smoothness) according to a predetermined physical property value (e.g., measured value of smoothness) of the product/semifinished product 60 indicated by the step result information 31. Moreover, the driving target 21 is the same information as the aforementioned lower target value 11 (e.g. increase smoothness by 20% from the current value).

The driving device 4 in the present embodiment can receive, from the sensor 51 of step 3, the same information as the step result information 31 or information of a same physical amount (for example, apart of information constituting the step result information) as the step result information for driving 32 (see FIG. 2E), and identify information of the driving details of the electric motor 5 being a value such as the rotational speed and torque of the electric motor 5, namely the command value, with a predetermined algorithm 4010 (FIG. 3A), to drive the electric motor 5 of step 3, in order to detect the current state of step 3 on the basis of the step result information for driving 32 and achieve the aforementioned driving target 21 from the current state.

The inverter 6 of the driving device 4 controls the electric motor 5 with this command value, and controls working operation using the working jig 42 via the driving means 41. The product/semifinished product 60 subjected to processing by the working jig 42 receives sensing from the sensor 51 for the quality information, which is the result of the processing. The configuration of the sensor 51 is not particularly limited, as long as the sensor 51 can measure physical values or the like according to attributes of the step target in the step.

Figure 3A:
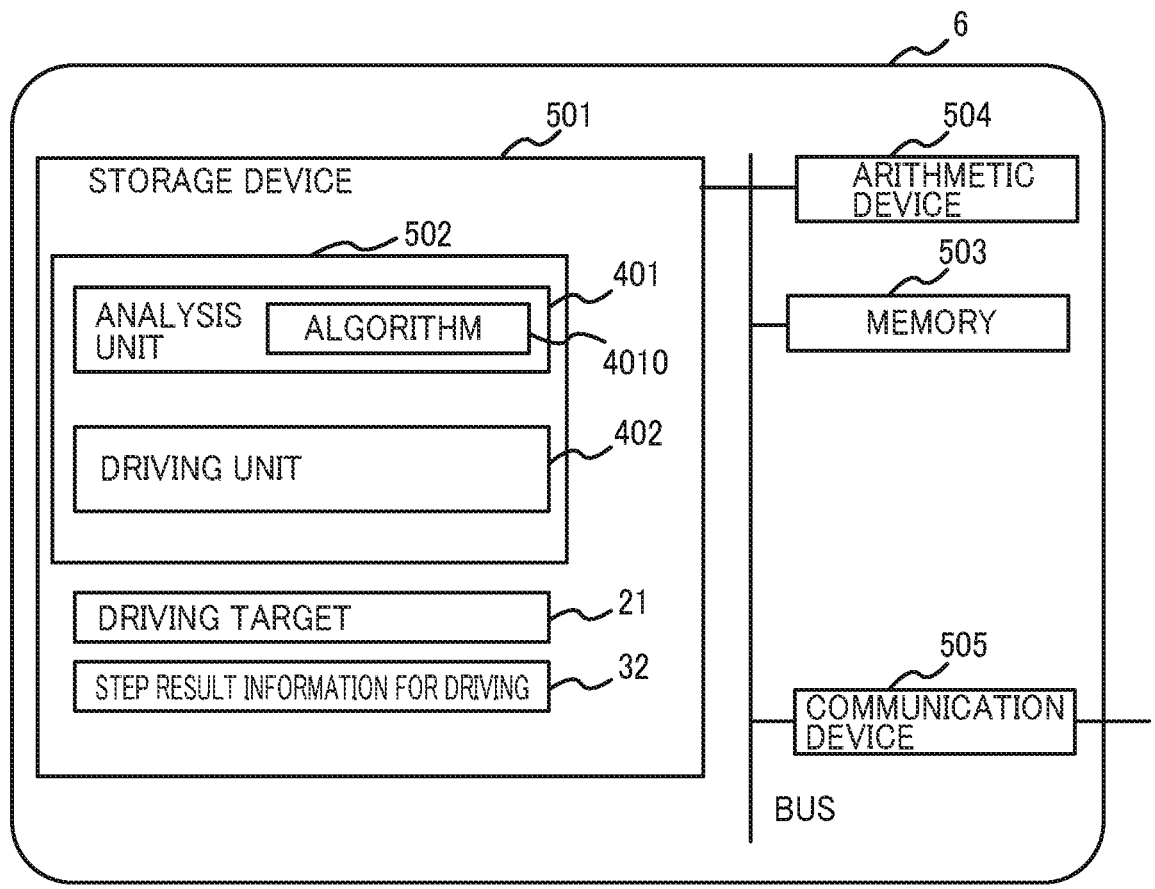
FIG. 3A is a view illustrating a hardware configuration example of an inverter in a driving device of Example 1.

A hardware configuration example of the inverter 6 in such a driving device 4 is illustrated in FIG. 3A. The inverter 6 includes a storage device 501 configured of an appropriate non-volatile storage element such as a solid state drive (SSD) and a hard disk drive, a memory 503 configured of a volatile storage element such as a RAM, a arithmetic device 504 such as a CPU that reads out a program 302 retained in the storage device 501 to the memory 503 to perform overall control of the device itself and performs various determinations, calculations and control processings, and a communication device 505 that couples with a predetermined network that couples the upper system 1 and lower system 2 with the sensor 51 to carry out communication processings.

In the storage device 501, at least the aforementioned driving target 21 and the step result information for driving 32 will be stored, in addition to a program. 502 for implementing an analysis unit 401 and a driving unit 402, which are necessary functions as the inverter 6 that mainly configures the driving device 4.

Figure 3B:
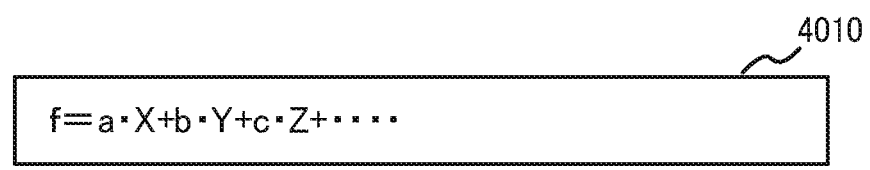
FIG. 3B is a view illustrating an example of an algorithm in the inverter of Example 1.

As described above, the inverter 6 of the driving device 4 implement each of the functions of the analysis unit 401 and the driving unit 402. Among these, the analysis unit 401 includes the algorithm 4010 that identifies the command value (control parameter of the electric motor 5) from the step result information for driving 32 and the driving target 21 in the step. This algorithm 4010, as illustrated in FIG. 3B, can be assumed as a regression formula achievable by performing a regression analysis of the step result information for driving 32 and the driving target 21 in the step with the command value (control parameter of the electric motor 5). In the case of the regression formula illustrated in FIG. 3B, this will be a linear formula to find a rotational speed f of the electric motor 5 for example, and is a formula in which predetermined coefficients a, b, . . . are multiplied to each respective variable such as a variable X that substitutes a value indicated by the step result information for driving 32 and variable Y that substitutes the driving target 21. Of course, such an algorithm 4010 is merely one example.

Figure 4A:
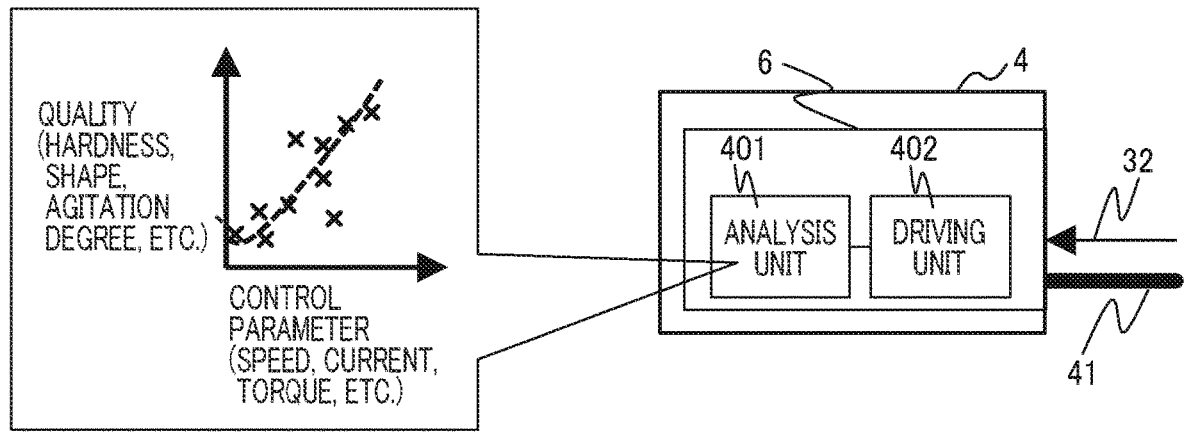
FIG. 4A is a view illustrating a configuration example of an inverter in the driving device of Example 1.

Moreover, the analysis unit 401 would be preferable to include an analysis engine that performs regression analysis of the step result information for driving 32 and the driving target 21 in the step, with the command value (control parameter of the electric motor 5), or a configuration of an artificial intelligence equivalent to the analysis engine. The artificial intelligence in this case is an engine that machine learns a corresponding pattern (FIG. 4A) between the driving target 21 and the step result information for driving 32 corresponding to the quality to be achieved in the step, and the control parameter of the electric motor 5 when achieving the driving target 21. In any of the aforementioned analysis engine and artificial intelligence, a configuration of an existing technology may be adopted as appropriate.

The analysis unit 401 in such configuration identifies information of driving details of the electric motor 5, namely values such as rotational speed and torque of the electric motor 5, namely command values, and provides them to the driving unit 402, to achieve the driving target 21 (e.g., increase smoothness by 20% from the current value) from the quality value (e.g. current value of smoothness) indicated by the step result information for driving 32 on the basis of the aforementioned step result information for driving 32 (e.g., quality such as hardness, smoothness, shape, agitation degree of the product/semifinished product 60 obtained by the step) and the driving target 21.

As the process result information for driving 32, either information of one that indicates a final state of the product/semifinished product 60 obtained by the step, or the other that indicates a state of the product/semifinished product 60 obtained in the middle of the step, may be employed. In a case in which the information indicating the final state among them is employed, the driving device 4, in a case in which that information has not yet reached the driving target (step target), for example a control parameter is identified to achieve the driving target and the electric motor 5 is controlled to continue the step, which allows for making the processing accuracy or the like related to the product/semifinished product 60 to reach the drive target. On the other hand, in a case of employing information indicating the state of the product/semifinished product 60 in the middle of the step, for example, dealings can be possible such as detecting that the state of the step has changed from the most recent predetermined time, identifying the control parameter and controlling the electric motor 5 to continue the step, in order to reach the driving target according to the change, to make the processing accuracy and the like related to the product/semifinished product 60 reach the drive target.

Moreover, as the information subjected to analysis in the analysis unit 401, by including, other than the quality information indicating the state of the product/semifinished product 60 by the step, appropriate environmental information such as ambient temperature and ambient humidity of the working jig 42 and the electric motor 5, and personnel information such as skilled levels of workers handling the step, it is possible to estimate the change in quality of the product/semifinished product 60 in the step with a predetermined algorithm (e.g., an algorithm obtainable by regression analyzing a smoothness achieved in a case of a worker of some skill level processing a predetermined product/semifinished product 60 under the environment of an ambient temperature of some temperature), and reflect the change on the control of the electric motor 5.

On the other hand, the driving unit 402 receives a command value from the aforementioned analysis unit 401, to perform the control operation of the electric motor 5, on the basis of the rotational speed and torque, the driving current of the electric motor 5, namely the control parameters, indicated by the command value. The operation of the driving unit 402 itself is the same as existing control mechanisms of the electric motor 5.

Example 2

Figure 4B:
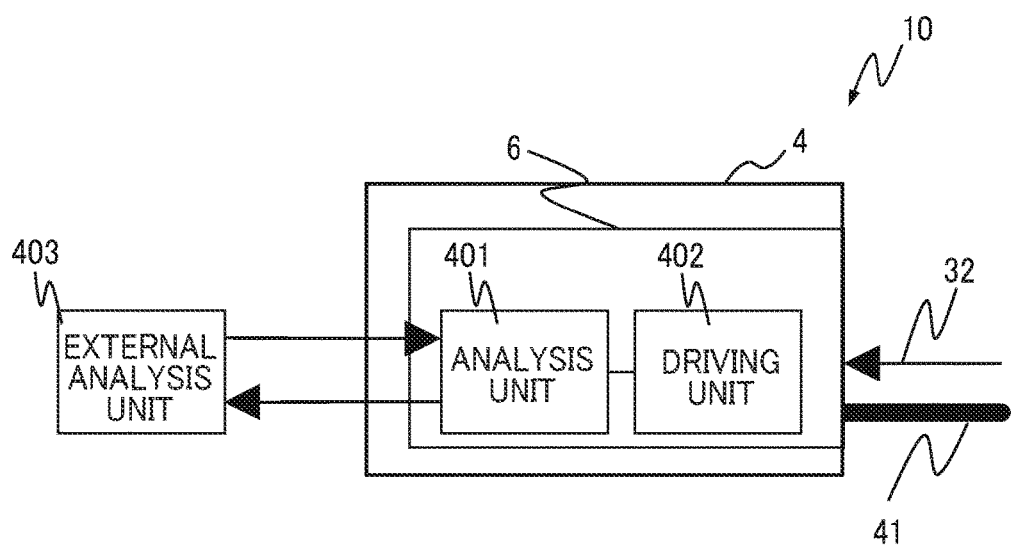
FIG. 4B is a view illustrating a configuration example of a manufacturing system in Example 2.

Next describes, with reference to FIG. 4B, a second Example of the present invention, regarding points that are different from the aforementioned Example 1. In the driving device 4 illustrated in FIG. 4B, the analysis process performed by the analysis unit 401 of Example 1 with the regression formula or analysis engine is performed in a form cooperating with an external analysis unit 403 included in an external device separate from the driving device 4 or the inverter 6.

This configuration addresses situations in which processings cannot be carried out at a predetermined speed just with the processing ability of the analysis unit 401 of the inverter 6 only, due to the data size of the step result information for driving 32, the driving target 21, and the command value (control parameter of the electric motor 5) subjected to analysis being large for example, and the analysis process itself is performed by the external analysis unit 403, and the analysis unit 401 utilizes that performed result. In this case, the external analysis unit 403 includes the same functions and configurations as the analysis unit 401, and can communicate with the analysis unit 401.

By employing such a configuration, a good analysis accuracy and analysis time may be achieved, regardless of the size of data subjected to the analysis.

Example 3

Figure 5:
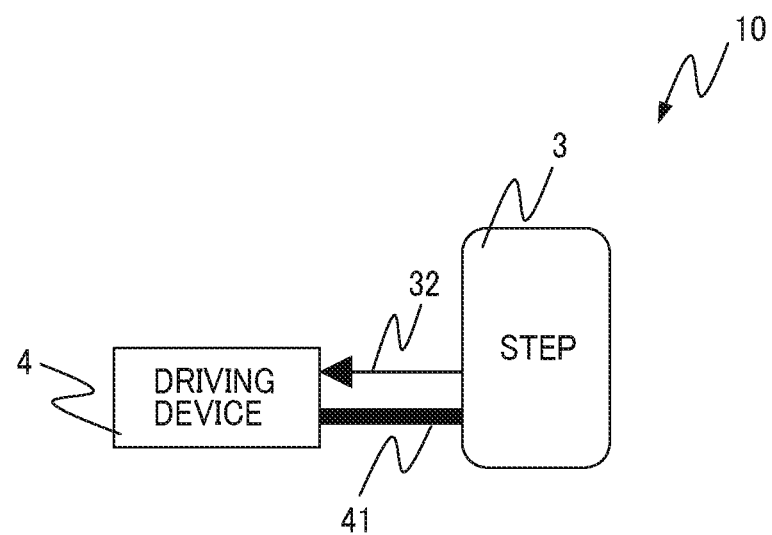
FIG. 5 is a view illustrating a configuration example of a manufacturing system in Example 3.

Next describes, with reference to FIG. 5, a third Example of the present invention, regarding points that differ from the aforementioned Examples 1 and 2. In Example 3, no upper system 1 and lower system 2 are used, the electric motor 5 is driven just with (the inverter 6 of) the driving device 4, to control the working jig 42 of step 3.

The driving device 4 in this case stores a step target 12 of a step that the driving device 4 is responsible for (or, a lower target value 11 or driving target 21 same as this) in the storage device 101 in advance. The operation of the driving device 4 is, as described in the aforementioned Example 1, becomes one in which the analysis unit 401 in the inverter 6 identifies a command value (control parameter of the electric motor 5) with an algorithm 4010 from the step result information for driving 32 and the step target (namely, driving target 21) in the step, and provides the command value to the driving unit 402.

With such a configuration, the upper system 1 and the lower system 2 may be omitted from the manufacturing system 10 to reduce the size of the overall system.

Example 4

Figure 6:
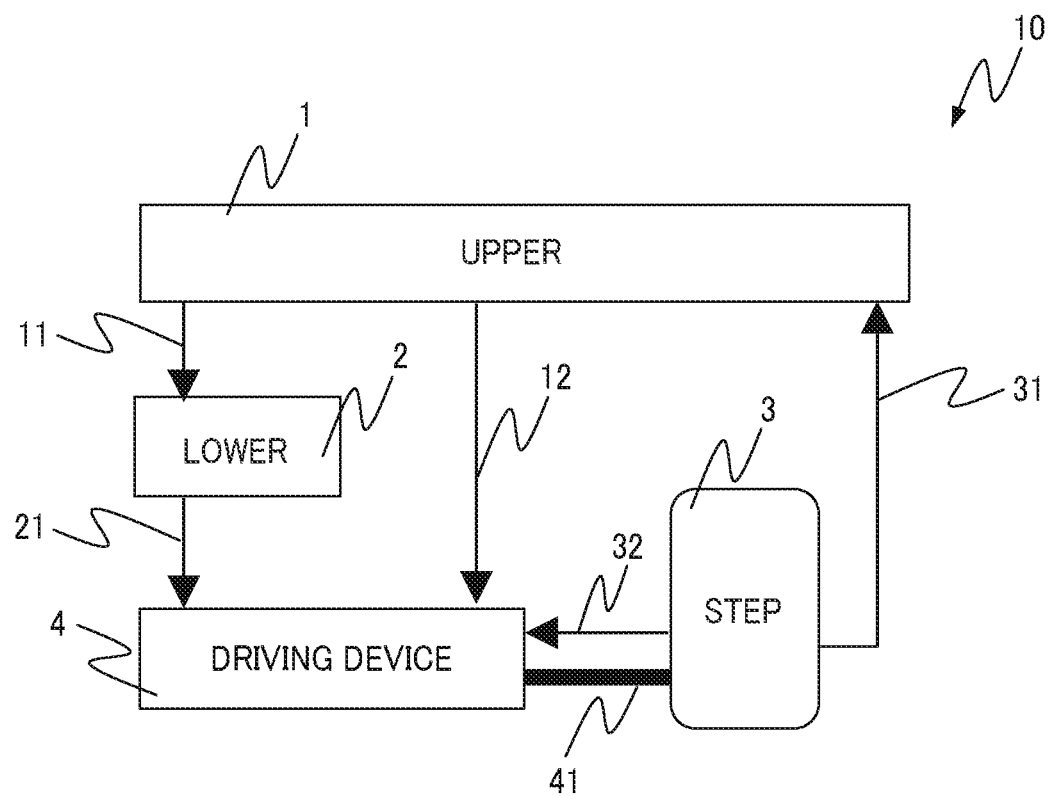
FIG. 6 is a view illustrating a configuration example of a manufacturing system in Example 4.

Next describes, with reference to FIG. 6, a fourth Example of the present invention, regarding points that are different from the aforementioned Examples 1 to 3. In the example shown in FIG. 6, the upper system 1 provides the step target 12 to the driving device 4, in addition to Example 1. Alternatively, the step target 12 may be provided to the driving device 4 by including it into the driving target 21 through the lower system 2.

By employing such a configuration, it is possible in the driving device 4 to perform the driving control of the electric motor 5 of the step in accordance with a final target of the series of steps managed by the upper system 1, namely the process target 12, while receiving the step result information for driving 32 of the step and detecting the state of the step.

In this case, the algorithm 4010 in the analysis unit 401 of the inverter 6 can be assumed as a regression formula obtained by performing regression analysis of the step result information for driving 32, the driving target 21, and the step target 12, with the command value (control parameter of the electric motor 5). Therefore, in the case of the regression formula, this will be for example a linear formula finding a rotational speed f of the electric motor 5, and has predetermined coefficients a, b, c, . . . multiplied to each respective variable such as the variable X that substitutes a value indicated by the step result information for driving 32, the variable Y that substitutes the driving target 21, and a variable Z that substitutes the step target 12.

Example 5

Figure 7:
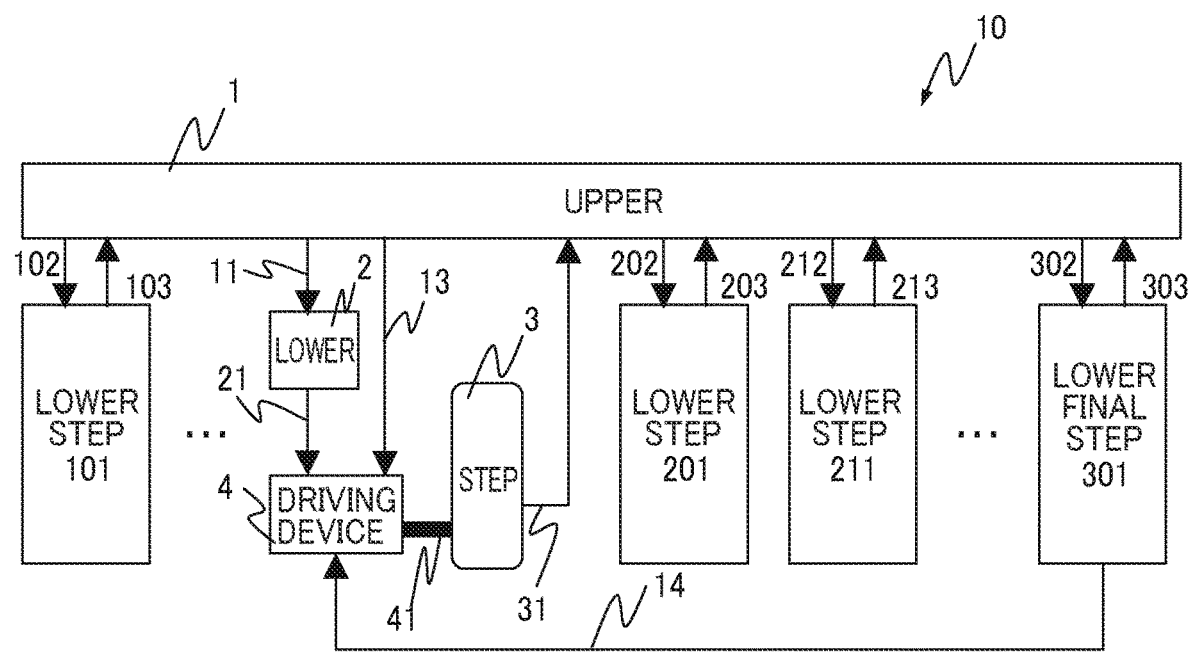
FIG. 7 is a view illustrating a configuration example of a manufacturing system in Example 5.

Next describes, with reference to FIG. 7, a fifth Example of the present invention, regarding points that differ from the aforementioned Examples 1 to 4. In the manufacturing system 10 illustrated in FIG. 7, the series of steps to be managed include steps 101, 201, 211, 301.

In the manufacturing system 10 of such a configuration, target information 102, 202, 212, 302 are provided to the lower system as lower target values 11 related to each of the steps, from the upper system 1. Moreover, as the step result information 31 of each step, result information 103, 203, 213, 303 are sent to the upper system 1 from each step.

In the present example, in step 3, the manufacturing system 10 obtains a final target 13 serving as a final target of the series of steps (identical to the step target 12 shown in the case of just one step), from the upper system 1. The step 3 obtains final step information 14 being the step result information for driving 32 of the final step 301, which is the final step for accomplishing the target of the manufacturing system 10.

When employing such a configuration, it may be assumed that the analysis unit 401 in the inverter 6 of the step 3 has, as the algorithm 4010, a regression formula achievable by performing a regression analysis of the final step information 14, the step result information for driving 32 of step 3, the driving target 21, and the final target 13, with the command value (control parameter of the electric motor 5). Therefore, in the case of the regression formula, this will be for example a linear formula to find the rotational speed f of the electric motor 5, and has predetermined coefficients a, b, c, d, . . . multiplied by each respective variable such as the variable X that substitutes a value indicated by the step result information for driving 32, the variable Y that substitutes the driving target 21, a variable Z that substitutes the final target 13, and a variable T that substitutes the final step information 14. As a result, in the aforementioned step 3, it is possible to control the step 3 while detecting the situation of the most important final step among the series of steps.

As illustrated in FIG. 7, as to the manufacturing system 10 constituted of the series of steps, a situation of controlling the steps such as rubber kneading, extruding, rolling, and molding, when applied to the manufacture of tire rubber may be assumed. Alternatively, when applied to the manufacture of chemical products, situations of controlling steps such as distillation, mixing, extruding, molding can be assumed.

The driving device 4 in the aforementioned Example 5 can perform step control in consideration of the final target, by controlling the step on the basis of not just the target of the single step, but the target and step result of the final step being another step. Such a configuration may be applied to a situation in which a step error of a step prior to the step 3 is compensated in the step 3 being the step after. In this case, the driving device 4 may obtain information of the error generated in the step before the step 3 as the step result information for driving 32, apply the information 32 to the regression formula for correction operation (one obtained in the regression analysis of the error in the previous step with the control parameter at the time of the correction operation) to identify the control parameter at the time of the correction operation, and control the electric motor 5 with the control parameter. By reducing the error occurring in the previous step in step 3, the load on the step after the step 3 may be reduced.

Example 6

Figure 8:
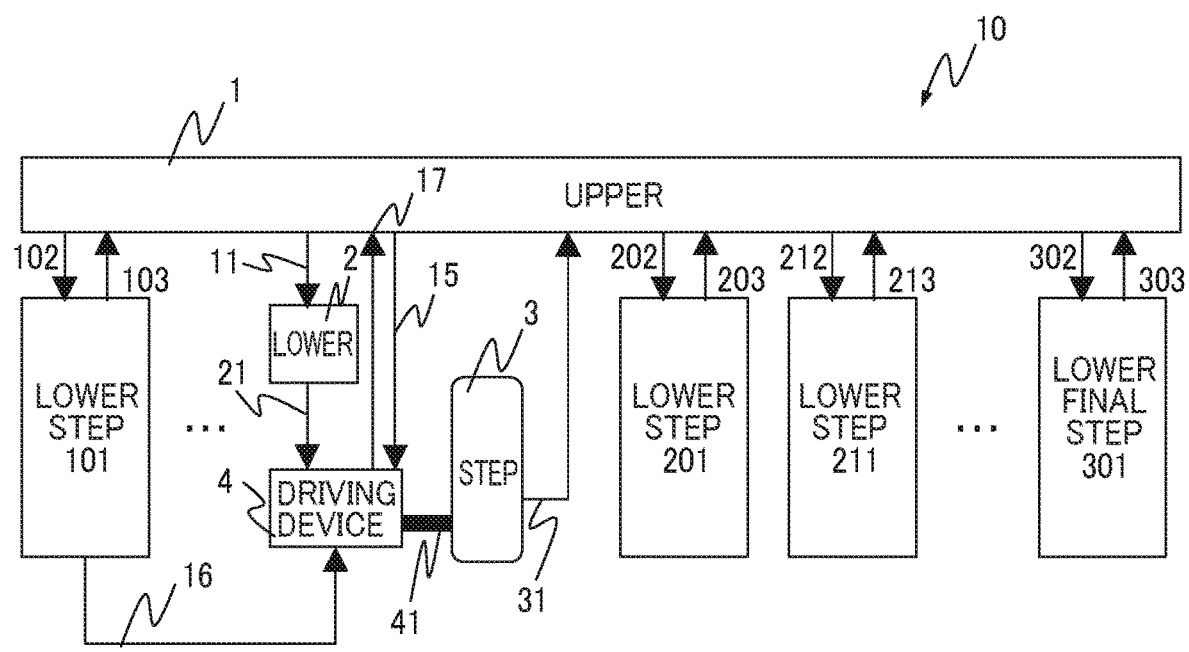
FIG. 8 is a view illustrating a configuration example of a manufacturing system in Example 6.

Next described, with respect to FIG. 8, is a sixth Example of the present invention, regarding points that are different from the aforementioned Examples 1 to 5.

In the manufacturing system 10 shown in FIG. 8, the driving device 4 is configured to output the step driving information 17 that is the details of the actual driving of the electric motor 5 in the step 3, to the upper system 1 for example that is outside the driving device, or to another device coupled communicable to the manufacturing system 10.

This allows for providing as required, the aforementioned step driving information 17 being driving know-bows of the electric motor 5 by the driving device 4, to others or systems that needs the information 17.

The above describes in detail of the best mode for implementing the present invention, however the present invention is not limited to the embodiments, and is modifiable in various ways without departing from its gist.

According to such present embodiments, information identical to the target value of the step or information with an identical physical amount such as KPI in the upper system is allowed to be handled directly by the manufacturing device of the step, to increase the speed of various corrections and control in the steps. This further allows for improving the efficiency in manufacture and improving the quality of the product, in the manufacturing system.

Namely, in a manufacturing system including an upper system configured to manage the overall manufacturing processes and a lower system configured to control each step, a time lag occurring in relation to a command from the upper system to the lower system can be reduced, thus allowing improvement in efficiency and quality of manufacture.

From the descriptions in the present specification, at least the followings are made clear. Namely, in the manufacturing system of the present embodiment, the production management system may comprise an upper system configured to provide, to a lower system configured to manage a step, a target value of the step based on the predetermined information related to the step, and a lower system configured to provide, to the driving device executing the step, a command value for the manufacturing machine based on the target value, wherein the driving device obtains the predetermined information related to the step and identifies the command value according to the target value of the step based on the predetermined information, to drive the manufacturing machine.

According to the above, in the production management system including the upper system and the lower system, the driving device that drives the manufacturing machine can perform steps in line with the step target, as with the lower system.

Moreover, in the manufacturing system of the present embodiment, the driving device may obtain information indicating a result of the step as the predetermined information related to the step and identifies the command value according to the target value of the step based on the predetermined information, to drive the manufacturing machine.

According to the above, the driving device can drive the manufacturing machine in view of a step result corresponding to a target value of the step that the driving device itself deals with (e.g., KPI and information for calculating KPI).

Moreover, in the manufacturing system of the present embodiment, the driving device may obtain information related to a middle state of the step as the predetermined information related to the step and identifies the command value according to the target value of the step based on the predetermined information, to drive the manufacturing machine.

According to the above, the driving device can drive the manufacturing machine in view of a result in the middle of the step, corresponding to a target value of the step that the driving device itself deals with (e.g., KPI and information for calculating KPI).

Moreover, in the manufacturing system of the present embodiment, the production management system may comprise an upper system configured to manage each step on the basis of a target value of a final step among a series of steps and provide target values of each step based on the predetermined information related to each respective one of the series of steps to a lower system, and a lower system pertaining to each respective one of the series of steps, the lower system being configured to provide, to the driving device executing the steps, a command value for the manufacturing machine based on the target value, wherein the driving device further obtains, in the step, the predetermined information related to another step other than the step, and identifies the command value according to the target value of the step based on each predetermined information of the step and the other step, to drive the manufacturing machine.

The above configuration allows for a control in which the driving device that drives a manufacturing machine of one step obtains a target value or the like in a step other than the step, and identifies a command value of their own step to compare with the target value or the like.

Moreover, in the manufacturing system of the present embodiment, the driving device may further obtain, in the step, a target value of the other step, and identify the command value according to the target value of the step on the basis of each predetermined information of the step and the other step as well as the obtained target value of the other step, to drive the manufacturing machine.

The above configuration allows for a control in which the driving device that drives a manufacturing machine of one step obtains a target value or the like in a step other than the step, and identifies a command value of their own step to compare with the target value or the like.

Moreover, in the manufacturing system of the present embodiment, the driving device may obtain, in the step, predetermined information of a step prior to the step as predetermined information of the other step, and identify the command value according to the target value of the step based on each predetermined information of the step and the other step, to drive the manufacturing machine.

The above configuration allows for a control in which the driving device that drives a manufacturing machine of one step obtains a target value or the like in a step prior to the step, and identifies a command value of their own step to compare with the target value or the like.

Moreover, in the manufacturing system of the present embodiment, the driving device may obtain, in the final step, a target value of the final step from the upper system, and identify the command value according to the target value of the final step on the basis of predetermined information of the final step and the obtained target value of the final step, to drive the manufacturing machine.

The above configuration allows for a control in which the driving device that drives a manufacturing machine of one step obtains a target value or the like in a final step separate from the step, and identifies a command value of their own step to compare with the target value or the like.

Moreover, in the manufacturing system of the present embodiment, the driving device may output driving information to a predetermined device, the driving information being information related to driving of the manufacturing machine based on the command value in the step.

The above configuration allows for providing the aforementioned driving information to other persons and systems desiring for that information, the driving information being driving know-bows of the manufacturing machine by the driving device.

Moreover, in the manufacturing system of the present embodiment, the driving device may further comprise information analysis means configured to identify the command value according to a target value of the step based on the predetermined information.

The above configuration allows for the driving device itself to perform regression analysis of a KPI value (e.g., hardness, smoothness, shape, agitation degree) corresponding to the quality and the like of the product with driving details of the manufacturing machine (e.g., motor rotational speed, torque) and identify a command value efficiently and promptly with a regression formula or the like, and instruct the command value to the manufacturing machine.

Moreover, in the manufacturing system of the present embodiment, the driving device may obtain, in the information analysis means, predetermined information from information analysis means of a predetermined external device, and identify the command value on the basis of the information.

The above configuration allows for the driving device itself to obtain not only a configuration of performing the aforementioned information analysis, but also to obtain an analysis result (e.g., regression formula) performed in another device coupled by a network or a predetermined wiring, and identify a command value efficiently and promptly on the basis of the analysis result, to instruct to the manufacturing machine.

Moreover, in the manufacturing system of the present embodiment, the driving device may identify, in the information analysis means, the command value according to a target value of the step based on the predetermined information, by artificial intelligence.

The above configuration allows for the driving device to identify a relationship of the command value with respect to the target value not only by the conventional statistical method but also by analysis with artificial intelligence, to drive the manufacturing machine with a command value identified on the basis of the relationship.

Moreover, in the manufacturing system of the present embodiment, the driving device may obtain, as the predetermined information, one or more selected from the group consisting of quality information, environmental information, and personnel information, the quality information indicating one or more selected from the group consisting of hardness, smoothness, shape, temperature, humidity, and agitation degree of a product subjected to processing in the step, the environmental information indicating one or more selected from the group consisting of ambient temperature and humidity in the step, and the personnel information indicating a skilled level of personnel involved in the step, to drive the manufacturing machine in the step according to the predetermined information.

The above configuration allows for the driving details of the manufacturing machine to correspond to attributes of quality, environment, and personnel, in the driving device.

Moreover, in the manufacturing system of the present embodiment, the driving device may be an inverter configured to control an electric motor, the inverter driving the electric motor being the manufacturing machine in the step, according to predetermined information obtained in relation to a state of the step.

The above configuration allows for the inverter being the driving device to promptly and efficiently control the electric motor serving as the manufacturing machine according to a target value in relation to the attributes of quality, environment, and personnel.

What is claimed is:

1. A manufacturing system comprising:
    a manufacturing execution system (MES) configured to manage each of a series of manufacturing steps based on a target value;
    a sensor coupled to a jig;
    an electric motor configured to drive the jig to manufacture a product in at least two steps;
    an inverter that controls the electric motor; and
    a lower system connected to the MES and the inverter,
    wherein the MES provides, to the lower system, a lower target value that is information in response to driving details of the electric motor to achieve the target value of a step of the series of manufacturing steps based on step result information related to the step,
    wherein the lower system provides, to the inverter, driving target information that is information that has the same content as the lower target value,
    wherein the inverter obtains the step result information related to the step and identifies a command value that is information of driving details of the electric motor to achieve the driving target according to the target value of the step based on the step result information to drive the electric motor.

2. The manufacturing system according to claim 1,
    wherein the manufacturing execution system (MES) manages each of the series of manufacturing steps based on the target value of a final step among the series of manufacturing steps and provides target values of each step based on at least the step result information, which indicates at least a measured value of a characteristic measured by the sensor of a product to be manufactured related to each respective step of the series of manufacturing steps to the lower system,
    wherein the inverter obtains, in each step, predetermined information related to another step other than the step, and determines the command value according to the target value of the step based on each predetermined information of the step and the other step.

3. The manufacturing system according to claim 2,
    wherein the inverter is configured to:
    obtain a target value of a step other than a current step, and determines the command value according to the target value of the step based on the obtained target value of the other step, the received information indicating the measured value and the received driving target information.

4. The manufacturing system according to claim 2,
    wherein the inverter is configured to:
    obtain, in a final step of the series of steps, a target value of the final step from the MES and determine the command value according to the target value of the final step based on the received information indicating the measured value, the received driving target information and the obtained target value of the final step.

5. The manufacturing system according to claim 1,
    wherein the inverter is configured to:
    train, using machine learning, an engine that learns a corresponding pattern between the received driving target information and the received information indicating the measured value to a characteristic to be achieved for the product to be manufactured and a control parameter of the electric motor, and
    determine a command value of the electric motor based on the trained engine.

6. The manufacturing system according to claim 1, wherein the characteristic is one of quality information, the quality information indicating one or more selected from the group consisting of hardness, smoothness, shape, temperature, humidity, and agitation degree of the product to be manufactured.

7. A manufacturing method comprising:
    providing, by a manufacturing execution system (MES), to a lower system, a lower target value that is information in response to driving details of an electric motor to achieve the target value of a step of the series of manufacturing steps based on step result information related to the step, providing, by the lower system, to the inverter, driving target information that is information that has the same content as the lower target value, obtaining, by the inverter, the step result information related to the step and identifying a command value that is information of driving details of the electric motor to achieve the driving target according to the target value of the step based on the step result information to drive the electric motor.

\* \* \* \* \*